(12) United States Patent
Suehiro et al.

(10) Patent No.: US 12,737,075 B2
(45) Date of Patent: Sep. 15, 2026

(54) DISPLAY DEVICE WITH TOUCH PANEL AND METHOD FOR CONTROLLING DISPLAY DEVICE WITH TOUCH PANEL

(71) Applicant: Sharp Display Technology Corporation, Kameyama City (JP)

(72) Inventors: Daisuke Suehiro, Kameyama City (JP); Daiji Kitagawa, Kameyama City (JP); Jin Miyazawa, Kameyama City (JP); Yousuke Nakamura, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 18/659,810

(22) Filed: May 9, 2024

(65) Prior Publication Data

US 2024/0411402 A1 Dec. 12, 2024

(30) Foreign Application Priority Data

Jun. 12, 2023 (JP) ................................ 2023-096633

(51) Int. Cl.
*G06F 3/01* (2006.01)
*G06F 3/041* (2006.01)

(52) U.S. Cl.
CPC ........ *G06F 3/04166* (2019.05); *G06F 3/0412* (2013.01)

(58) Field of Classification Search
None
See application file for complete search history.

(56) References Cited

U.S. PATENT DOCUMENTS

2016/0370915 A1* 12/2016 Agarwal ............... G06F 3/0443
2018/0095575 A1 4/2018 Ota et al.
2021/0019011 A1 1/2021 Kitagawa et al.

FOREIGN PATENT DOCUMENTS

JP 2018-060319 A 4/2018

* cited by examiner

*Primary Examiner* — Joseph R Haley
(74) *Attorney, Agent, or Firm* — ScienBiziP, P.C.

(57) ABSTRACT

A display device with a touch panel starts a first touch detection process within an extension period, and ends the first touch detection process before a normal drive period starts. The display device with a touch panel performs a process of outputting first report data when a length of the extension period is equal to or longer than a predetermined length. The display device with a touch panel performs, after the normal drive period starts, a second touch detection process, a writing process, and a process of outputting second report data.

3 Claims, 9 Drawing Sheets

TN
TLa
TLa1
TLa2
NORMAL DRIVE PERIOD
EXTENSION PERIOD
NORMAL DRIVE PERIOD
EXTENSION PERIOD
V
T
D
V
T
V
T
D
V
T
ST
SR
TT
RP
t0
T0
TT
t1
t2
t3
t4
t5
RP
t6
t7a
t7b
TR1
t7c
RP
t7
t8

TLc
TLc1
TLc2
EXTENSION PERIOD
EXTENSION PERIOD
NORMAL DRIVE PERIOD
V
T
D
ST
SR
RP
RP
TRx

EXTENSION PERIOD
NORMAL DRIVE PERIOD
EXTENSION PERIOD
NORMAL DRIVE PERIOD
V
T
D
V
T
V
T
D
V
T
ST
SR
RP
RP
RP
TLd
TLd1
TLd2
TT
T0
TT

EXTENSION PERIOD
EXTENSION PERIOD
NORMAL DRIVE PERIOD
NORMAL DRIVE PERIOD
V
T
D
TLe
TLe1
TLe2
T0
TTb
ST
SR
RP
RP

DISPLAY DEVICE WITH TOUCH PANEL AND METHOD FOR CONTROLLING DISPLAY DEVICE WITH TOUCH PANEL

BACKGROUND

1. Field

The present disclosure relates to a display device with a touch panel and a method for controlling the display device with a touch panel.

2. Description of the Related Art

Japanese Unexamined Patent Application Publication No. 2018-60319 describes a display device with a touch panel. The display device with a touch panel includes a display unit, a detection unit, and a control unit. The display unit performs a display operation for displaying images. The detection unit performs a touch detection operation for detecting detection signals corresponding to externally approaching objects in a touch detection period different from a normal drive period in which a display operation is performed. One frame period in which an image of one frame is displayed includes a normal drive period, a touch detection period, and a display adjustment period for adjusting a display of the image. When the control unit performs a low-speed drive of 33.3 ms (30 Hz) that is a predetermined one frame period longer than a period of 16.6 ms (60 Hz) that is one frame period in a normal drive, the control unit performs the touch detection operation in the display adjustment period.

There is a demand for a display device with a touch panel that operates at a variable frame rate at which the length of one frame period changes in various ways, instead of only two types of frame periods of one frame period in the normal drive and one frame period in the low-speed drive, and a control method for controlling the display device with a touch panel. In this case, one frame period includes a period in which the length changes (hereinafter, referred to as "a first period") and a period in which the normal drive is performed after the first period (hereinafter, referred to as "a second period").

However, in the display device with a touch panel that operates at a variable frame rate, when the length of the first period is short, the second period starts while the touch detection operation started during the first period is performed. Thus, the normal drive may be started while the touch detection operation is still being performed, and the touch detection operation started during the first period may affect the normal drive during the second period.

In order to address such problem, there is a method in which the touch detection operation is not performed during the first period. However, in this case, the cycle of the touch detection operation becomes longer according to the length of the first period. As a result, the cycle in which a touch is detected becomes longer.

Therefore, the present disclosure has been made to address the above-described problem, and provides a display device with a touch panel capable of avoiding an effect of a touch detection process, which starts during a first period of one frame period including the first period and a second period, on a process performed during the second period while avoiding elongation of a cycle in which a touch is detected even when operating at a variable frame rate, and a method for the display device with a touch panel.

SUMMARY

In order to address the above problem, a display device with a touch panel according to a first aspect of the present disclosure is a display device with a touch panel that operates at a variable frame rate. The variable frame rate is achieved by changing a length of a first period of one frame period including the first period and a second period. The display device with a touch panel includes a touch panel including pixel electrodes, and a control unit configured to perform a writing process of writing data signals to the pixel electrodes and a touch detection process by the touch panel. The control unit is configured to start a first touch detection process within the first period, end the first touch detection process before the second period starts after the first touch detection process starts, not output first report data reporting a detection result of the first touch detection process when a length of the first period is shorter than a predetermined length and output the first report data when the length of the first period is equal to or longer than the predetermined length, and perform, after the second period starts, a second touch detection process, the writing process, and a process of outputting second report data reporting a detection result of the second touch detection process.

A method for controlling a display device with a touch panel according to a second aspect of the present disclosure is a method for controlling a display device with a touch panel including a touch panel that includes pixel electrodes and operates at a variable frame rate. The variable frame rate is achieved by changing a length of a first period of one frame period including the first period and a second period, The method includes starting a first touch detection process by the touch panel within the first period, ending the first touch detection process before the second period starts after the first touch detection process starts, not outputting first report data reporting a detection result of the first touch detection process when a length of the first period is shorter than a predetermined length and outputting the first report data when the length of the first period is equal to or longer than the predetermined length, and performing, after the second period starts, a second touch detection process by the touch panel, a writing process of writing data signals to the pixel electrodes, and a process of outputting second report data reporting a detection result of the second touch detection process.

DESCRIPTION OF THE EMBODIMENTS

Figure 1:
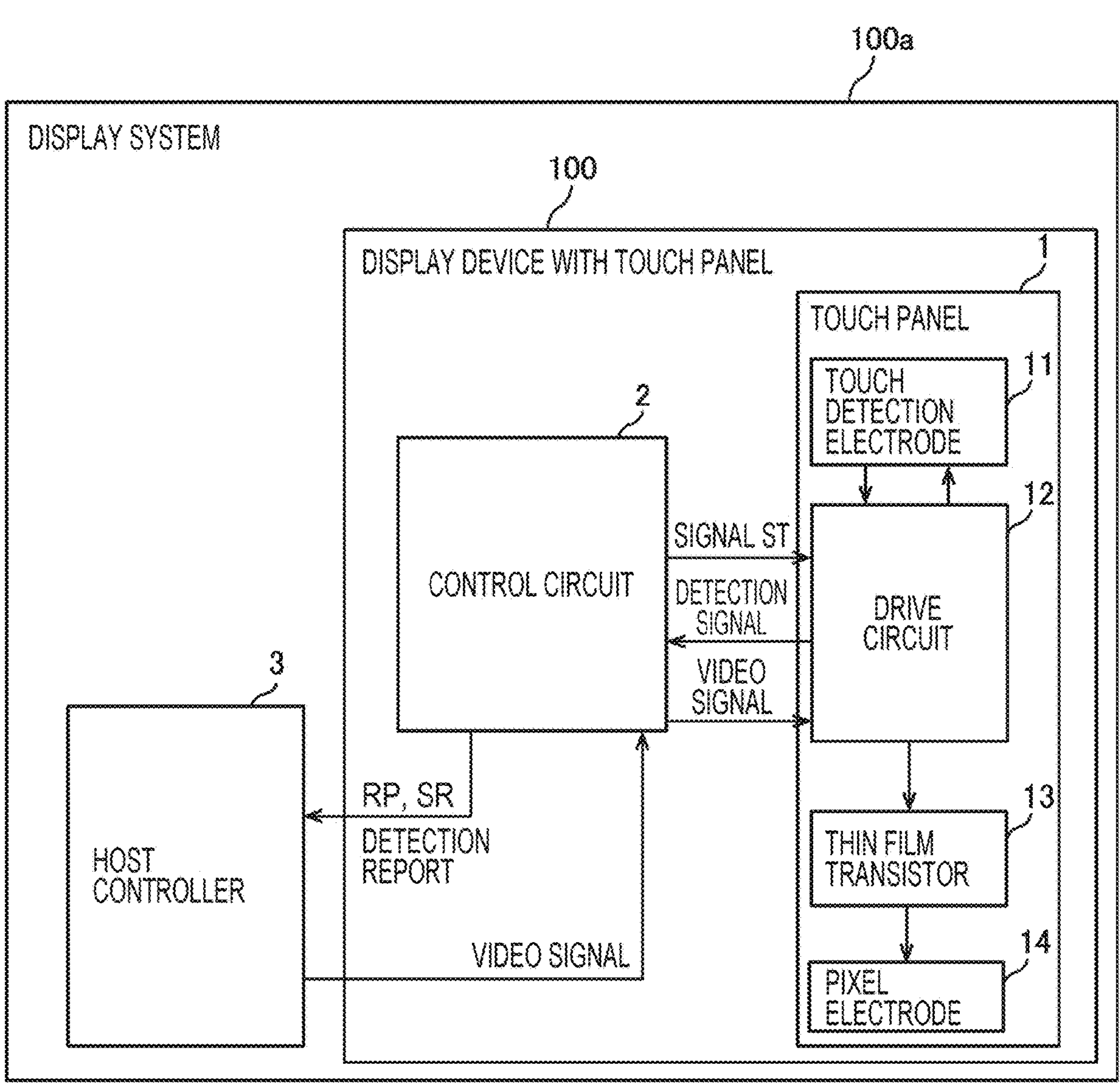
FIG. 1 is a block diagram illustrating a configuration of a display system according to an embodiment of the present disclosure.

Hereinafter, embodiments of the present disclosure will be described in detail with reference to the drawings. In the drawings, the same or corresponding parts are denoted by the same reference numerals, and the description thereof will not be repeated. In order to make the description easy to understand, in the drawings referred to below, the configuration is illustrated in a simplified or schematic manner, or some constituent members are omitted. In addition, dimensional ratios between constituent members illustrated in the drawings do not necessarily indicate actual dimensional ratios.

Overall Configuration of Display System

A configuration of a display device with a touch panel 100 (hereinafter referred to as a "display device 100") according to the present embodiment and a configuration of a display system 100*a* according to the present embodiment will be described. FIG. 1 is a block diagram illustrating a configuration of the display system 100*a* according to the present embodiment.

As illustrated in FIG. 1, the display system 100*a* includes a display device 100 and a host controller 3. In FIG. 1, the display device 100 and the host controller 3 are illustrated separately. However, a configuration functioning as the display device 100 and a configuration functioning as the host controller 3 may be integrated into one apparatus.

The display device 100 includes a touch panel 1 and a control circuit 2. The display device 100 displays a video or an image on the touch panel 1. In addition, the display device 100 detects, using the touch panel 1, a touch by an indicator. The indicator includes a finger and a pen. The control circuit 2 includes a processor that performs a control process related to touch detection of the touch panel 1 and a control process related to display.

Figure 2:
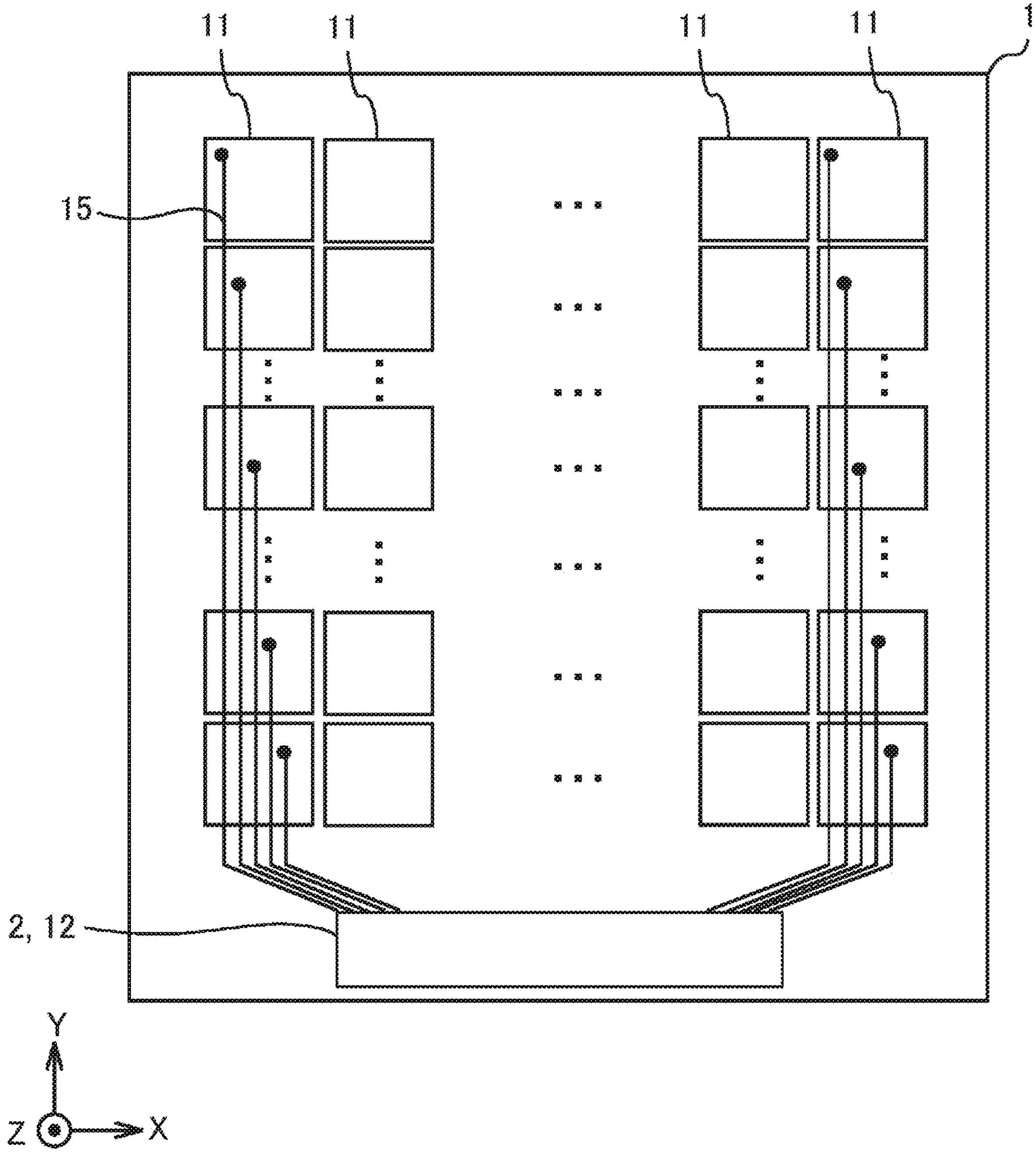
FIG. 2 is a plan view schematically illustrating a configuration of a touch panel.

FIG. 2 is a plan view schematically illustrating a configuration of the touch panel 1. As illustrated in FIG. 2, the touch panel 1 includes touch detection electrodes 11, a drive circuit 12, thin film transistors 13, and pixel electrodes 14. In the present embodiment, the control circuit 2 is disposed on the touch panel 1. The control circuit 2 is not limited to this example, and may be disposed outside the touch panel 1, and the control circuit 2 and the touch panel 1 may be connected to each other by wiring (for example, a flexible printed circuit board). The touch panel 1 is, for example, an in-cell touch panel. That is, each touch detection electrode 11 serves as both an electrode for detecting a touch and a counter electrode for generating an electric field between the counter electrode and the pixel electrode 14 for displaying a video. In FIG. 1, for ease of description, one touch detection electrode 11 and one pixel electrode 14 are illustrated. The drive circuit 12 includes, for example, one or more integrated circuits.

As illustrated in FIG. 2, the touch detection electrodes 11 are arranged, for example, in a matrix. The drive circuit 12 includes a touch detection driver. The touch detection electrodes 11 and the drive circuit 12 (touch detection driver) are connected to each other via the touch signal lines 15. A capacitance of the touch detection electrodes 11 is changed by capacitive coupling between the touch detection electrodes 11 and the indicator. The drive circuit 12 supplies a touch drive signal (pulse signal) to the touch detection electrodes 11. A waveform of the pulse signal changes corresponding to values of the capacitance of the touch detection electrodes 11. The drive circuit 12 detects a touch (touched position) by an indicator based on a waveform of a pulse signal from the touch detection electrodes 11 (hereinafter, referred to as a "detection signal"). Note that "touch" is a concept including not only contact of an indicator with the touch panel 1 but also approach of the indicator to the touch panel 1. That is, the touch panel 1 is a self-capacitance touch panel, but not limited to this example. The touch panel 1 may be configured as a mutual-capacitance touch panel. A process for detecting the touch of the indicator on the touch panel 1 is hereinafter referred to as "a touch detection process".

Figure 3:
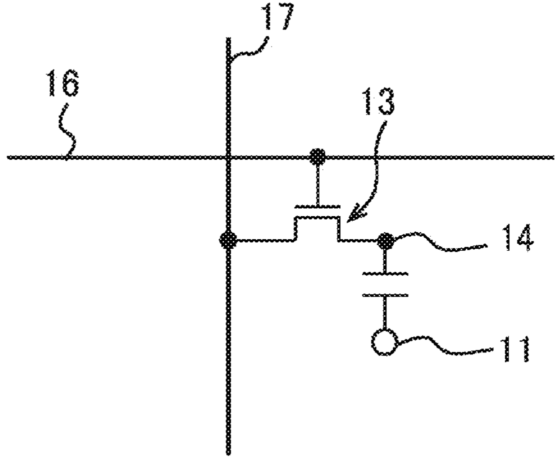
FIG. 3 is a circuit diagram illustrating a connection relationship between a thin film transistor and a pixel electrode.

FIG. 3 is a circuit diagram illustrating a connection relationship between the thin film transistor 13 and the pixel electrode 14. The drive circuit 12 (see FIG. 1) further includes a gate driver and a source driver. The gate driver of the drive circuit 12 is connected to a gate line 16. The source driver of the drive circuit 12 is connected to a source line 17. A gate electrode of the thin film transistor 13 is connected to the gate line 16, and a source electrode of the thin film transistor 13 is connected to the source line 17. A drain electrode of the thin film transistor 13 is connected to the pixel electrode 14. A capacitance is generated between the pixel electrode 14 and the touch detection electrode 11. The touch detection electrode 11 is provided in common to the pixel electrodes 14 and functions as a common electrode.

The gate driver of the drive circuit 12 sequentially supplies a gate signal (a scanning signal) to each of the gate lines 16. The source driver of the drive circuit 12 supplies a data signal based on a video signal to each of the source lines 17. Accordingly, the thin film transistor 13 to which the gate signal is supplied is turned on, and the data signal is written to the pixel electrode 14. A process of writing the data signal to the pixel electrode 14 is hereinafter referred to as "a writing process". In the touch panel 1, a liquid crystal layer (not illustrated) is driven by an electric field generated by the pixel electrodes 14 and the touch detection electrode 11 (common electrode), and a video is displayed.

Figure 4:
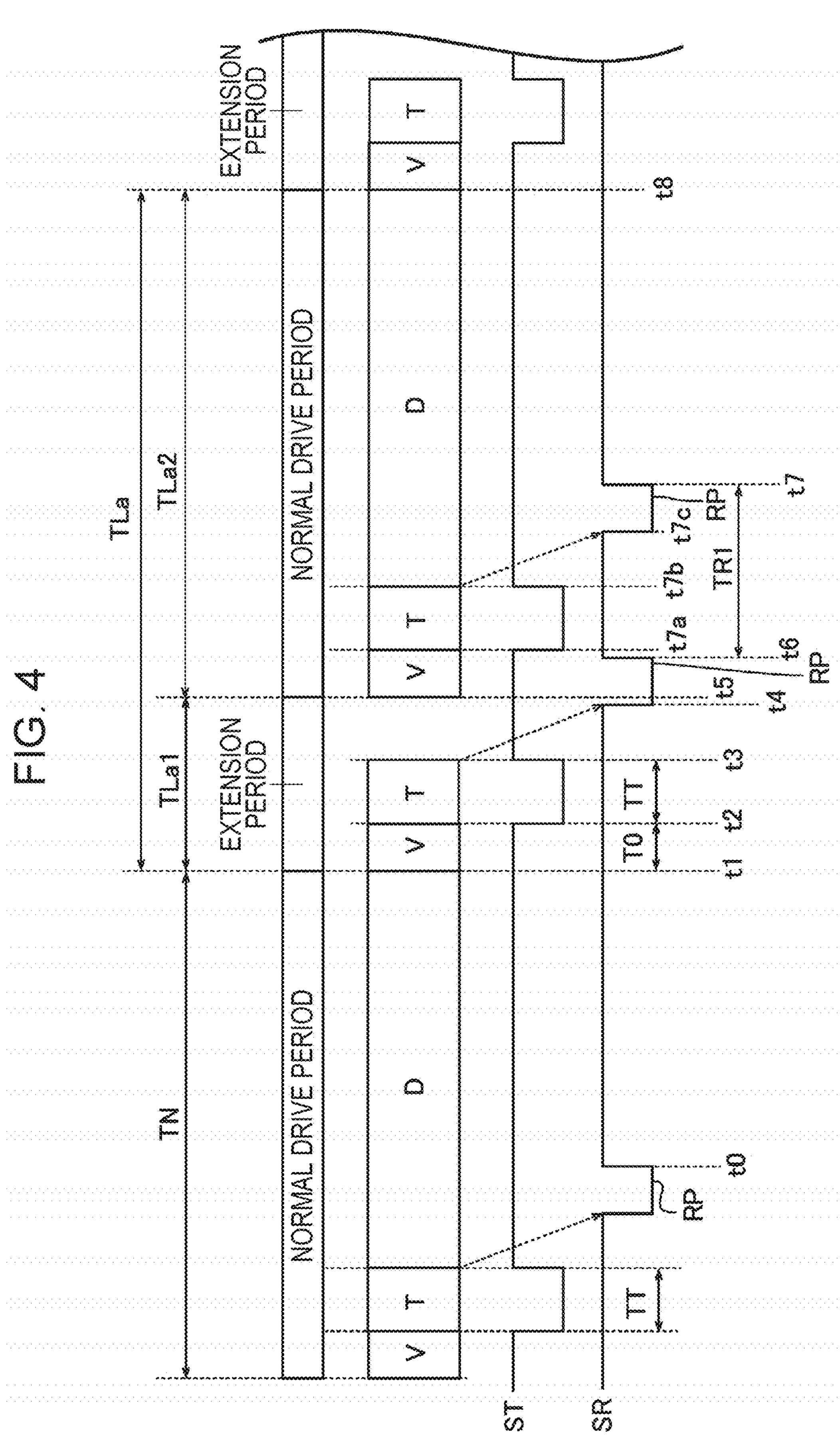
FIG. 4 is a diagram illustrating an operation of a display device at a variable frame rate.
Figure 5:
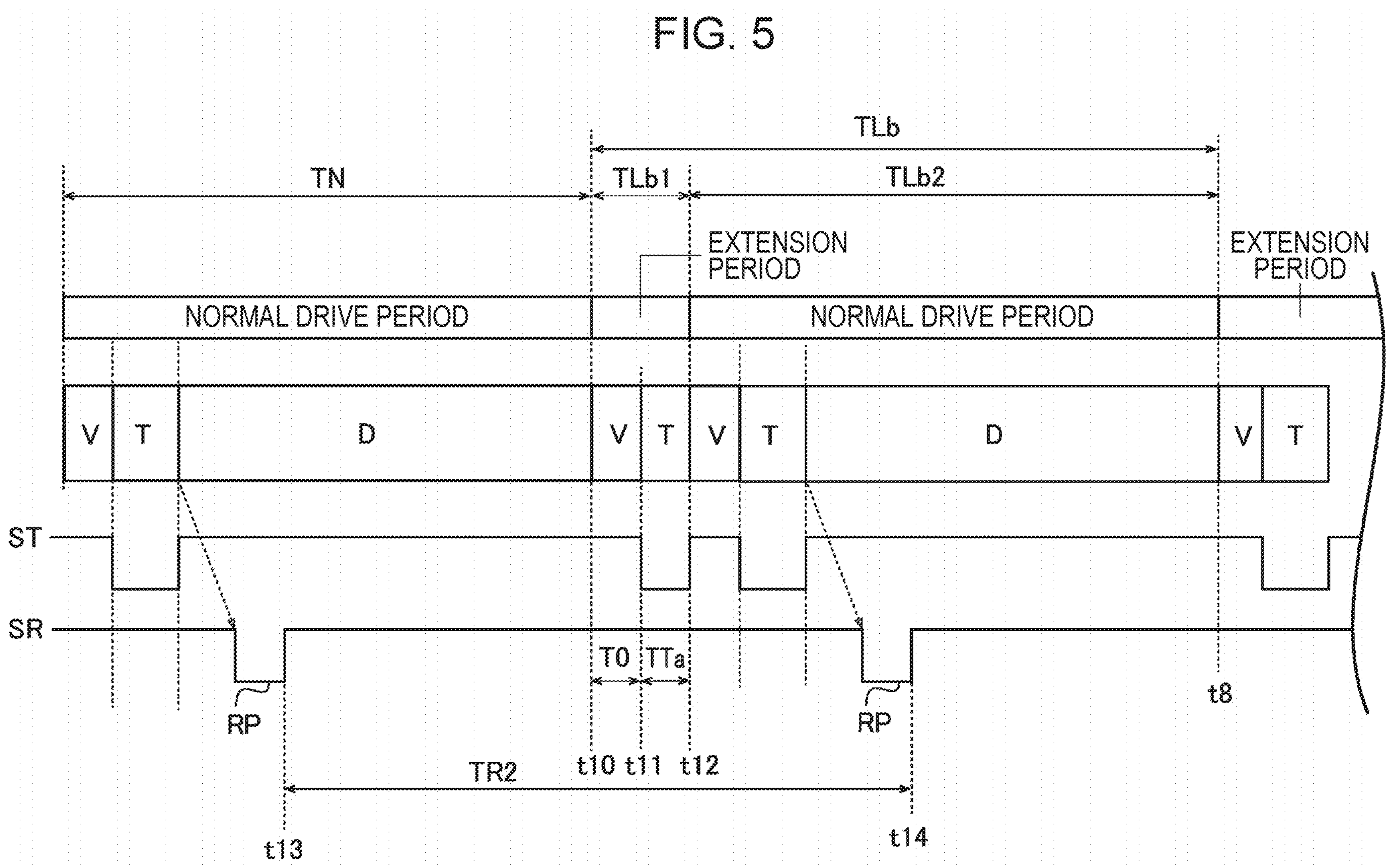
FIG. 5 is a diagram illustrating an operation of the display device at a variable frame rate.
Figure 6:
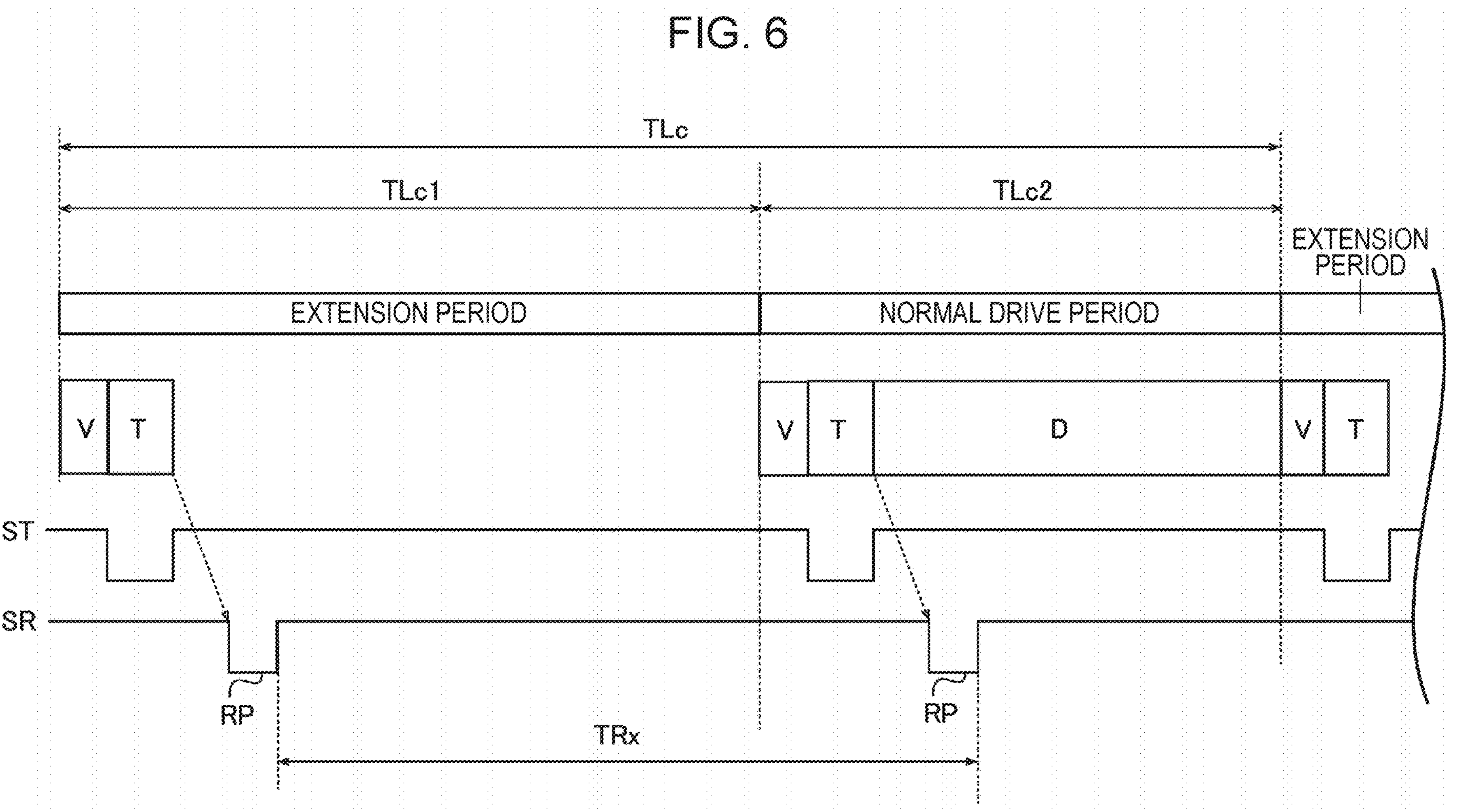
FIG. 6 is a diagram illustrating an operation of the display device at a variable frame rate.

FIGS. 4 to 6 are diagrams illustrating an operation of the display device 100 at a variable frame rate. Here, as illustrated in FIGS. 4 to 6, the display device 100 is a display device that operates at a variable frame rate. The "variable frame rate" is achieved by changing a length of a first period of one frame period including the first period and a second period. In the present embodiment, the first period is hereinafter referred to as "an extension period". The second period is hereinafter referred to as "a normal drive period". The "one frame period" is a time interval in which a vertical synchronizing signal is input to the drive circuit 12. The normal drive period is a period having a certain fixed length (a period the length of which does not change). Further, the extension period is a period for extending a length of one frame period with respect to the normal drive period. The length of the extension period may vary regularly or randomly. In addition, the length of the extension period may periodically change for each frame or for two or more frames, or may change in a random cycle. Further, a purpose of using the variable frame rate is not particularly limited. For example, in order to reduce power consumption, the frame rate may be changed in accordance with the amount of change (motion) of images in a moving picture. In this case, the display device 100 operates at a high frame rate (for example, 120 Hz) in a scene where the amount of change in images is large, and operates at a low frame rate (for example, 60 Hz) in a scene where the amount of change in images is small.

As illustrated in FIG. 4, the control circuit 2 inputs a signal ST for causing the drive circuit 12 to perform the touch detection process. The drive circuit 12 performs the touch detection process when the signal ST is at a Low level, and stops the touch detection process when the signal ST is at a High level. Further, the control circuit 2 transmits, to the host controller 3, report data RP including the touch position (touch coordinates) detected by the drive circuit 12. As illustrated in FIG. 4, the host controller 3 receives (reads) the report data RP when a strobe signal SR output from the control circuit 2 becomes a Low level.

As illustrated in FIG. 4, the normal drive period includes the touch detection period T in which a touch detection process is performed, a display period D in which the writing process is performed, and a vertical blanking period V (vertical retrace period). In the present embodiment, the vertical blanking (vertical blanking period V), the touch detection process (touch detection period T), and the writing process (display period D) are performed in this order in the normal drive period. That is, in the normal drive period, the control circuit 2 changes the signal ST from the High level to the Low level after the end of the vertical blanking period V, and then changes the signal ST to the High level. A length of the vertical blanking period V does not change and is TO. In the present embodiment, the display device 100 is driven by a long vertical blanking (LVB) scheme in which the vertical blanking period V is set only once within the normal drive period.

The extension period is a period in which the writing process is not performed and an update of the display on the touch panel 1 is suspended. When the extension period is not set within one frame period (when the length of the extension period is 0), the frame rate becomes the upper limit value. In this case, as illustrated in FIG. 4, the length of one frame period is equal to the length of the normal drive period TN.

As illustrated in FIG. 4, one frame period TLa includes an extension period TLa1 and a normal drive period TLa2. In the present embodiment, the normal drive period TLa2 is set after the extension period TLa1 in the one frame period TLa. The extension period TLa1 includes a vertical blanking period V and a touch detection period T. That is, in the present embodiment, the touch detection process is performed within the extension period TLa1. Here, when the touch detection rate is improved, a control circuit (IC) may be configured to perform an additional touch detection process within the normal drive period. However, in a case where the additional touch detection processing is performed within the normal drive period, it is recommended to prepare in advance a margin for enabling the additional touch detection processing to be performed within the normal drive period even when the drive in which the additional touch detection processing does not need to be added is performed. In the in-cell touch panel, since the touch detection process and the writing process are performed in a time-division manner, it is recommended to provide a control circuit (IC) having a higher performance in order to provide the above-described margin. Therefore, a drive in which another additional touch detection process is not added (normal drive) may be performed by a control circuit (IC) having excessive performance. In contrast, in the present embodiment, since the touch detection process is added within the extension period, a drive in the normal drive period is not changed. As a result, according to the present embodiment, the performance of the control circuit (IC) does not become excessive.

Here, as illustrated in FIG. 4, when a length of the extension period is equal to or longer than a predetermined length for the touch detection process, the control circuit 2 outputs, to the host controller 3, the report data RP for reporting a detection result of the touch detection process. In the example illustrated in FIG. 4, the "predetermined length for the touch detection process" is the sum of a length of the period T0 (vertical blanking period V) from a time point t1 at which the extension period TLa1 starts to a time point t2 at which the touch detection process starts and a length TT of a period T during which the touch detection process is being performed. The length TT is a time for acquiring (scanning) all the detection signals of the touch detection electrodes 11. That is, when the length of the extension period is equal to or longer than the sum of lengths of the periods T0 and TT, the report data RP is output to the host controller 3. The report data RP is output to the host controller 3 at a time point t4 later than a time point t3 at which the touch detection process ends.

Thus, the cycle in which the report data RP is output (the cycle in which a touch is detected) can be shortened to the period TR1 from a time point t6 to a time point t7 as compared with the case where the touch detection process is not performed in the extension period (the case where the period from a time point t0 to the time point t7 is one cycle). That is, according to the above configuration, the touch detection rate can be increased. At a time point t5 after the time point t3, the extension period TLa1 is switched to the normal drive period TLa2. Note that, in FIG. 4, the time point t4 is illustrated as a time point before the time point t5, but the time point t4 may be after the time point t5.

In the display device 100, it is assumed that a maximum value of the cycle of touch detection (a minimum value of the touch detection rate) is TRr. That is, it is assumed that the cycle of touch detection is equal to or shorter than TRr. In this case, a maximum value of the length of the extension period is TRr. For example, it is assumed that the normal drive period TN is 8.33 ms (120 Hz) and the maximum value TRr is 9.09 ms (the lower limit value of the touch detection rate is 110 Hz). Here, in the example illustrated in FIG. 4, since the extension period TLa1 is 0.76 ms, the period TR1 (the period from the time point t6 of the touch detection in the extension period to the time point t7 of the touch detection in the normal drive period) is 0.76 ms. Therefore, the period TR1 is shorter than the maximum value (9.09 ms) of the cycle of touch detection.

In addition, the display device 100 operates with respect to a video signal in which a lower limit value x of a frame rate (a repetition frequency of a frame) satisfies Expression (1) below, where a frame rate where only the normal drive period TN is included in one frame period is set to f and a touch detection rate is set to m.

$$f \times m/(f+m) < x \quad (1)$$

Here, as in the above example, when m=110 and f=120, x>57.39.

FIG. 6 is a diagram illustrating operation during one frame period TLc when the frame rate is low (for example, 58 Hz). A period TRx from a time point when the report data RP is output in the extension period TLc1 to a time point when the report data RP is output in the normal drive period TLc2 is 8.91 ms. Therefore, the touch detection rate is 116 Hz, which is larger than m.

When the length of the extension period is shorter than the predetermined length for the touch detection process, the control circuit 2 discards the detection result of the touch detection process. For example, as illustrated in FIG. 5, when the extension period TLb1 is switched to the normal drive period TLb2, the control circuit 2 forces the touch detection process to end. Specifically, the control circuit 2 changes the signal ST from the Low level to the High level and forces the touch detection process to end when a time length TTa (a time length from an end time point t11 of the vertical blanking period V to a start time point t12 of the normal drive period TLb2) obtained by subtracting the time length T0 of the vertical blanking period V from the extension period TLb1 included in one frame period TLb is shorter than TT. When the time length TTa is shorter than TT, the control circuit 2 deletes the detection result of the touch detection process in the extension period TLb1 from a memory (not shown). The control circuit 2 holds the signal SR at the High level until the touch detection process in the normal drive period TLb2 is completed. When the touch detection process is not completed in the extension period, an unnecessary detection result can be discarded and uncompleted report data RP is not transmitted to the host controller 3.

In addition, even when the touch detection process is not performed within the extension period TLb1, since the length of the extension period TLb1 is short, a decrease in the touch detection rate is reduced. For example, as illustrated in FIG. 5, when the report data RP of the extension period TLb1 is not output to the host controller 3, the cycle TR2 of the touch detection is a period from a time point t13 at which the report data RP of the normal drive period TN immediately before the extension period TLb1 is output to a time point t14 at which the report data RP of the normal drive period TLb2 immediately after the extension period TLb1 is output. Here, when the extension period TLb1 is 0.68 ms and each of the normal drive periods TN and TLb2 is 8.33 ms, the cycle TR2 of the touch detection is 9.01 ms (=0.68 ms+8.33 ms). In this case, the touch detection rate is 111 Hz, which is higher than the lower limit value 110 Hz of the touch detection rate described above, and a decrease in the touch detection rate is maintained at a value higher than the lower limit value.

Method for Controlling Display Device

A method for controlling the display device 100 according to the present embodiment will be described with reference to FIGS. 4 and 5.

Case where Length of Extension Period is Equal to or Longer than Predetermined Length With reference to FIG. 4, a control method of the display device 100 in a case where the length of the extension period TLa1 is equal to or longer than the predetermined length (T0+TT) for the touch detection process will be described. As illustrated in FIG. 4, at the time point t1, the control circuit 2 starts the extension period TLa1 within the frame period TLa. The control circuit 2 does not perform the touch detection process and the writing process in a period from the time point t1 to the time point t2 (vertical blanking period V).

At the time point t2, when the vertical blanking period V ends, the control circuit 2 changes the signal ST from the High level to the Low level. During a period from the time point t2 to the time point t3, the control circuit 2 sets the signal ST to the Low level and performs the touch detection process.

In the period from the time point t4 to the time point t6, the control circuit 2 outputs the report data RP to the host controller 3. The host controller 3 acquires the report data RP.

At the time point t5, the control circuit 2 starts the normal drive period TLa2 within the frame period TLa. The control circuit 2 does not perform the touch detection process and the writing process in a period from the time point t5 to a time point t7a (vertical blanking period V).

At the time point t7a, when the vertical blanking period V ends, the control circuit 2 changes the signal ST from the High level to the Low level. During a period from the time point t1a to a time point t7b, the control circuit 2 sets the signal ST to the Low level and performs the touch detection process.

In a period (display period D) from the time point t7b to a time point t8, the control circuit 2 performs a writing process. In the period from a time point t7c to the time point t7, the control circuit 2 outputs the report data RP to the host controller 3. The host controller 3 acquires the report data RP. Then, at the time point t8, the next frame period is started.

Since the touch detection process is performed within the extension period TLa1, the above control method can avoid elongation of the cycle of detecting a touch. Case where Length of Extension Period is Shorter than Predetermined Length With reference to FIG. 5, a control method of the display device 100 in a case where the length of the extension period TLb1 is shorter than the predetermined length (T0+TT) for the touch detection process will be described. As illustrated in FIG. 5, at a time point t10, the control circuit 2 starts the extension period TLb1 within the frame period TLb. The control circuit 2 does not perform the touch detection process or the writing process in a period from the time point t10 to the time point t11 (vertical blanking period V).

At the time point t11, when the vertical blanking period V ends, the control circuit 2 changes the signal ST from the High level to the Low level. The control circuit 2 performs the touch detection process. Here, when the extension period TLb1 ends and the normal drive period TLb2 starts at the time point t12, the control circuit 2 changes the signal ST from the Low level to the High level, even when a length of a period in which the touch detection process is performed is shorter than TT. Thus, the touch detection process is forced to end (stop). In this case, the control circuit 2 does not output, to the host controller 3, the report data RP related to the stopped touch detection process.

At the time point t12, the control circuit 2 starts the normal drive period TLb2 within the frame period TLb. The subsequent control method is the same as the control method in the normal drive period TLa2 in the case where the length of the extension period is equal to or longer than the predetermined length for the touch detection process, and thus the description thereof will be omitted.

According to the above control method, even when the length of the extension period TLb1 is short, the touch detection process is forced to end before the normal drive period TLb2 starts. Thus, this control method can avoid an effect of the touch detection process started within the extension period TLb1 on a process performed within the normal drive period TLb2.

Modifications

The embodiments described above are merely examples for implementing the present disclosure. Therefore, the present disclosure is not limited to the above-described embodiments, and the above-described embodiments can be appropriately modified and implemented without departing from the spirit and scope of the present disclosure.

(1) While the example in which the touch detection process is performed once in each of the extension period and the normal drive period has been described in the above embodiment, the present disclosure is not limited to this example. That is, the touch detection process may be performed two or more times in each of the extension period and the normal drive period.

(2) In the above embodiment, numerical examples (for example, the length of the normal drive period is set to 8.33 ms) have been described, but the present disclosure is not limited to these examples. Values other than the above numerical examples (for example, the length of the normal drive period is set to 16.66 ms) may be applied to the display device of the present disclosure.

(3) In the above embodiment, the example in which the report data RP is output when the length of the extension period is equal to or longer than the sum (T0+TT) of the length T0 of the vertical blanking period V and the length TT of the touch detection period T has been described, but the present disclosure is not limited to this example. For example, in the case where the vertical blanking period V is set after the touch detection period T in the extension period, the report data RP may be output when the length of the extension period is equal to or longer than TT, or the report data RP may be output only when the length of the extension period is longer than T0+TT.

(4) In the above embodiment, the example in which the detection result of the touch detection process is deleted from the memory when the length of extension period is shorter than the sum (T0+TT) of the length T0 of the vertical blanking period V and the length TT of the touch detection period T has been described, but the present disclosure is not limited to this example. That is, the detection result may remain in the memory as long as the report data RP is not transmitted to the host controller 3 when the length of the extension period is shorter than the sum (T0+TT) of the length T0 of the vertical blanking period V and the length TT of the touch detection period T.

(5) In the above embodiment, the example in which the second period (normal drive period) is set after the first period (extension period) in one frame period has been described, but the present disclosure is not limited to this example. For example, as in a display system 200*a* according to modifications illustrated in FIGS. 7 to 9, the first period (extension period) may be set after the second period (normal drive period) in one frame period.

Figure 7:
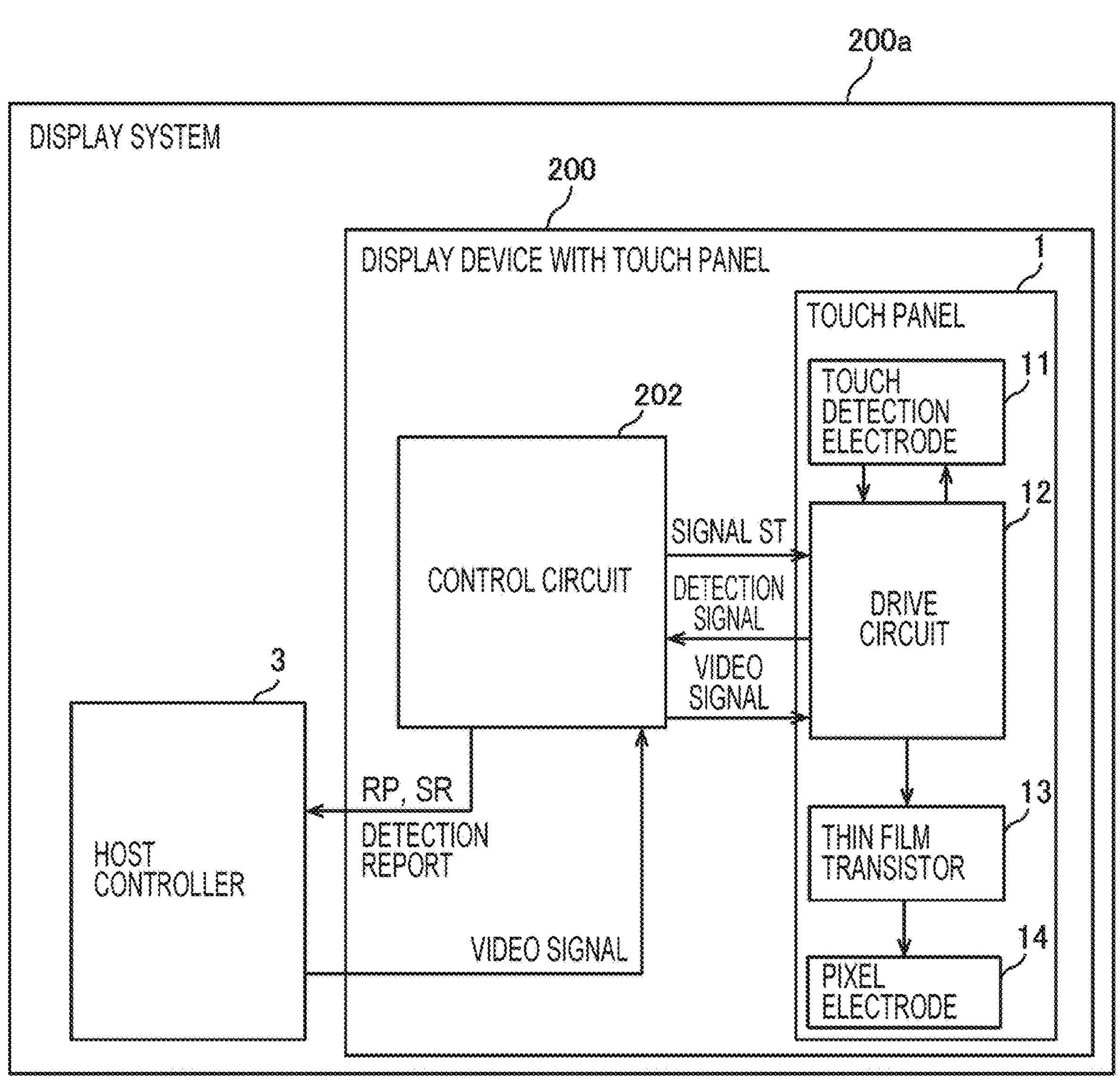
FIG. 7 is a block diagram illustrating a configuration of a display system according to a modification of an embodiment of the present disclosure.
Figure 8:
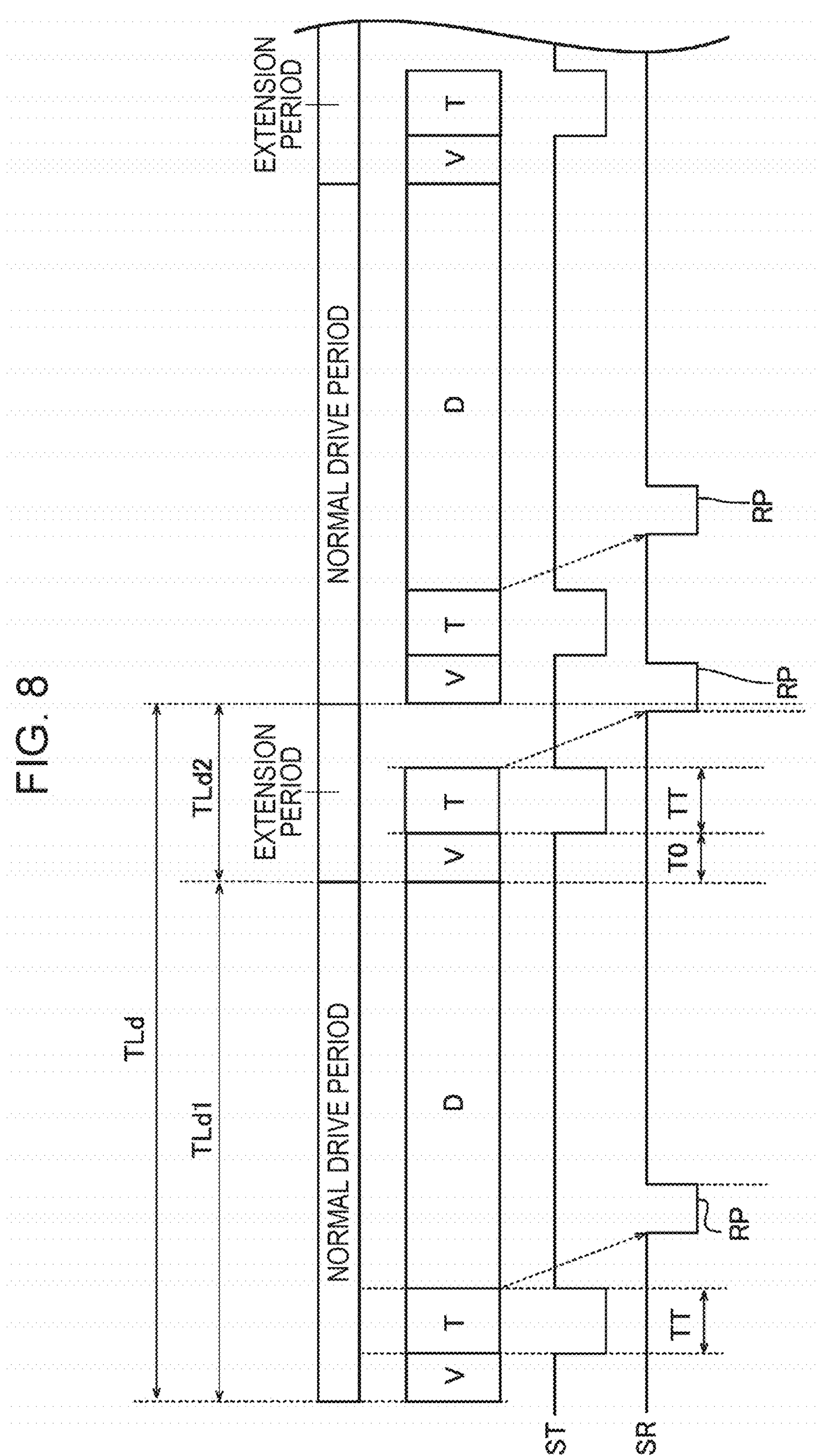
FIG. 8 is a diagram illustrating an operation of the display device at a variable frame rate, according to a modification of an embodiment of the present disclosure.
Figure 9:
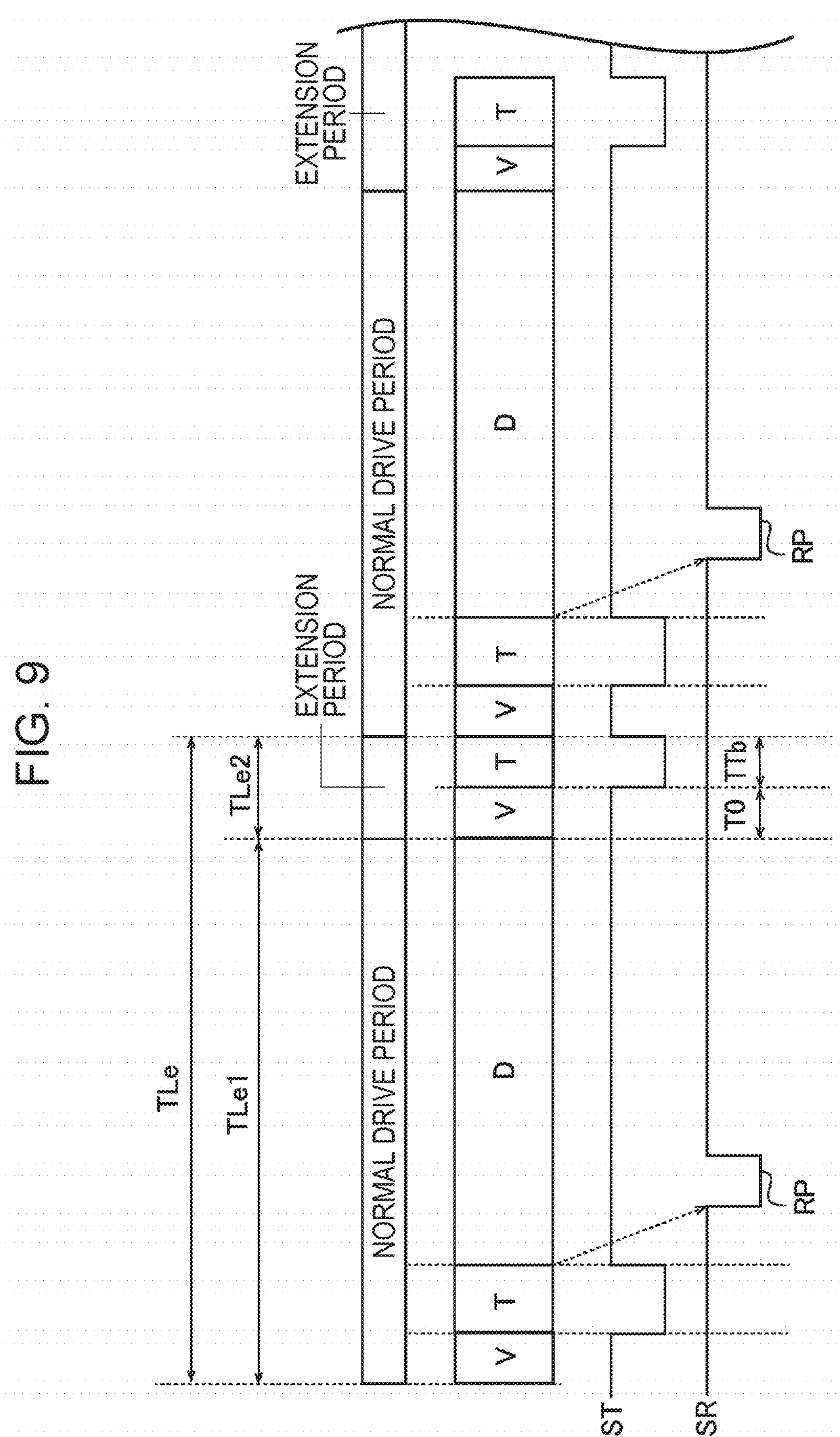
FIG. 9 is a diagram illustrating an operation of the display device at a variable frame rate, according to a modification of an embodiment of the present disclosure.

As illustrated in FIG. 7, a display system 200*a* according to a modification includes a display device with a touch panel 200 including a control circuit 202. As illustrated in FIG. 8, the control circuit 202 causes the drive circuit 12 to perform an operation of an extension period TLd2 after an operation of a normal drive period TLd1 within one frame period TLd. The control circuit 202 performs a touch detection process T in the extension period TLd2. The control circuit 202 outputs the report data RP to the host controller 3 when a length of the extension period TLd2 is equal to or longer than a predetermined length (for example, T0+TT). In addition, as illustrated in FIG. 9, the control circuit 202 discards the report data RP without outputting the report data RP to the host controller 3 when a length of an extension period TLe2 (T0+TTb in FIG. 9) is shorter than a predetermined length (for example, T0+TT). For example, when the next frame period is about to start during a touch detection process in the extension period TLe2 after a normal drive period TLe1 within a frame period TLe, the control circuit 202 ends the touch detection process and starts a drive in the normal drive period without outputting the report data RP. Thus, according to modifications, since the touch detection process is also performed in the extension period, an effect of the touch detection process started within the extension period on the process performed within the normal drive period can be avoided while elongation of a cycle in which a touch is detected is avoided.

The above-described configuration can be described as follows.

A display device with a touch panel according to a first configuration is a display device with a touch panel that operates at a variable frame rate. The variable frame rate is achieved by changing a length of a first period of one frame period including the first period and a second period. The display device with a touch panel includes a touch panel including pixel electrodes, and a control unit configured to perform a writing process of writing data signals to the pixel electrodes and a touch detection process by the touch panel. The control unit is configured to start a first touch detection process within the first period, end the first touch detection process before the second period starts after the first touch detection process starts, not output first report data reporting a detection result of the first touch detection process when a length of the first period is shorter than a predetermined length and output the first report data when the length of the first period is equal to or longer than the predetermined length, and perform, after the second period starts, a second touch detection process, the writing process, and a process of outputting second report data reporting a detection result of the second touch detection process (a first configuration).

According to the first configuration, even when the operation is performed at a variable frame rate at which the length of the first period changes, the first touch detection process is forced to end before the second period starts. Thus, the first configuration can avoid an effect of the first touch detection process started within the first period on the process performed within the second period after the first touch detection process. Since the process of outputting the first report data is performed when the length of the first period is equal to or longer than the predetermined length, the first configuration can avoid elongation of a cycle, in which the touch is detected, as compared with the case in which the touch detection process is not performed in the first period.

In the first configuration, the control unit is configured to end the first touch detection process when a length of a period in which the first touch detection process is performed becomes equal to or longer than the predetermined length within the first period (a second configuration).

According to the second configuration, the first touch detection process can be ended with the first touch detection process completed.

In the first and second configurations, the control unit is configured to perform a process of discarding the detection result of the first touch detection process when the length of the first period is shorter than the predetermined length (a third configuration).

According to the third configuration, when the first touch detection process is not completed, an unnecessary detection result can be discarded.

A method for controlling a display device with a touch panel according to a fourth configuration is a method for controlling a display device with a touch panel including a touch panel that includes pixel electrodes and operates at a variable frame rate. The variable frame rate is achieved by changing a length of a first period of one frame period including the first period and a second period. The method includes starting a first touch detection process by the touch panel within the first period, ending the first touch detection process before the second period starts after the first touch detection process starts, not outputting first report data reporting a detection result of the first touch detection process when a length of the first period is shorter than a predetermined length and outputting the first report data when the length of the first period is equal to or longer than the predetermined length, and performing, after the second period starts, a second touch detection process by the touch panel, a writing process of writing data signals to the pixel electrodes, and a process of outputting second report data reporting a detection result of the second touch detection process (a fourth configuration).

According to the fourth configuration, it is possible to provide the method for controlling the display device with a touch panel capable of avoiding an effect of a touch detection process, which starts within a first period of one frame period including the first period and a second period, on a process performed within the second period after the touch detection process while avoiding elongation of a cycle in which a touch is detected even when the display device operates at a variable frame rate.

The present disclosure contains subject matter related to that disclosed in Japanese Priority Patent Application JP 2023-096633 filed in the Japan Patent Office on Jun. 12, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device with a touch panel that operates at a variable frame rate, wherein the variable frame rate is achieved by changing a length of a first period of one frame period that includes the first period and a second period, the display device comprising:

the touch panel including pixel electrodes and a plurality of touch detection electrodes; and a control unit configured to:

perform a writing process of writing data signals to the pixel electrodes, perform a touch detection process for touches detected by the touch panel, wherein the touch detection process comprises at least a first touch detection process of acquiring first detection signals from the plurality of touch detection electrodes and a second touch detection process of acquiring second detection signals from the plurality of touch detection electrodes, start the first touch detection process within the first period, end the first touch detection process before a beginning of the second period that follows the first period, forgo outputting first report data reporting a detection result of the first touch detection process when the length of the first period is shorter than a length of a reference period obtained by adding a time required for acquiring the first and second detection signals from the plurality of touch detection electrodes to a length of a vertical blanking period, and output the first report data when the length of the first period is equal to, or longer than, the length of the reference period, and perform, after the second period starts, the second touch detection process, the writing process, and a process of outputting second report data reporting a detection result of the second touch detection process.

2. The display device with a touch panel according to claim 1, wherein the control unit is configured to end the first touch detection process, within the first period, when a length of a period, in which the first touch detection process is performed, becomes equal to, or longer than, the length of the reference period.

3. The display device with a touch panel according to claim 1, wherein the control unit is further configured to perform a process of discarding the detection result of the first touch detection process when the length of the first period is shorter than the length of the reference period.

* * * * *